(12) United States Patent
El-Ibiary

(10) Patent No.: US 7,299,915 B2
(45) Date of Patent: Nov. 27, 2007

(54) MOTORIZED PULLEY

(75) Inventor: Yehia M. El-Ibiary, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 37 days.

(21) Appl. No.: 11/005,258

(22) Filed: Dec. 6, 2004

(65) Prior Publication Data

US 2006/0118392 A1 Jun. 8, 2006

(51) Int. Cl.
*B65G 13/06* (2006.01)

(52) U.S. Cl. ............ 198/788; 198/780; 198/781.03; 198/832; 198/835; 198/789; 198/791; 492/46

(58) Field of Classification Search ............ 198/780, 198/781.03, 832, 835, 788, 789, 791; 492/46
See application file for complete search history.

(56) References Cited

U.S. PATENT DOCUMENTS

| | | | | |
|---|---|---|---|---|
| 1,825,119 A | * | 9/1931 | Mug | 198/788 |
| 2,175,860 A | * | 10/1939 | Waimann | 198/788 |
| 2,736,209 A | * | 2/1956 | Christian | 74/421 A |
| 2,915,167 A | * | 12/1959 | Berger | 198/788 |
| 3,789,783 A | * | 2/1974 | Cook et al. | 112/220 |
| 4,082,180 A | | 4/1978 | Chung | 198/835 |
| 5,088,596 A | * | 2/1992 | Agnoff | 198/788 |
| 5,180,344 A | | 1/1993 | Hall | 474/148 |
| 6,125,993 A | * | 10/2000 | Hansson | 198/788 |
| 6,497,267 B1 | * | 12/2002 | Azar et al. | 160/310 |
| 6,672,449 B2 | * | 1/2004 | Nakamura et al. | 198/788 |
| 2002/0056609 A1 | * | 5/2002 | Nakamura et al. | 198/780 |
| 2002/0060140 A1 | * | 5/2002 | Nakamura et al. | 198/788 |
| 2005/0087428 A1 | * | 4/2005 | Pelak et al. | 198/780 |
| 2005/0113216 A1 | * | 5/2005 | Cheng | 482/54 |
| 2005/0124477 A1 | * | 6/2005 | Umeda | 492/46 |
| 2006/0232147 A1 | * | 10/2006 | Cheng | 310/52 |

FOREIGN PATENT DOCUMENTS

| | | |
|---|---|---|
| DE | 2003292 A1 | 8/1971 |
| GB | 2032703 A | 5/1980 |
| WO | WO99/00317 A | 1/1999 |

* cited by examiner

*Primary Examiner*—Gene O. Crawford
*Assistant Examiner*—Leslie A Nicholson, III
(74) *Attorney, Agent, or Firm*—Thompson Coburn LLP

(57) ABSTRACT

The present technique, in accordance with one exemplary embodiment, relates to a motorized pulley. The exemplary motorized pulley includes a rim or housing inside of which are disposed an electric motor and a gear assembly, which is configured to transfer torque of the electric motor to the housing. Thus, during operation of the motor, the exemplary pulley rotates the housing in relation to a support structure to which the motorized pulley is mounted. To improve the dissipation of heat generated during operation of the motor, the motor is thermally coupled to the frame. Additionally, the rotor shaft of the exemplary motorized pulley extends into the external environment surrounding the pulley, thereby facilitating the operation of a machine element located externally with respect to the pulley via the electric motor disposed within the pulley.

12 Claims, 4 Drawing Sheets

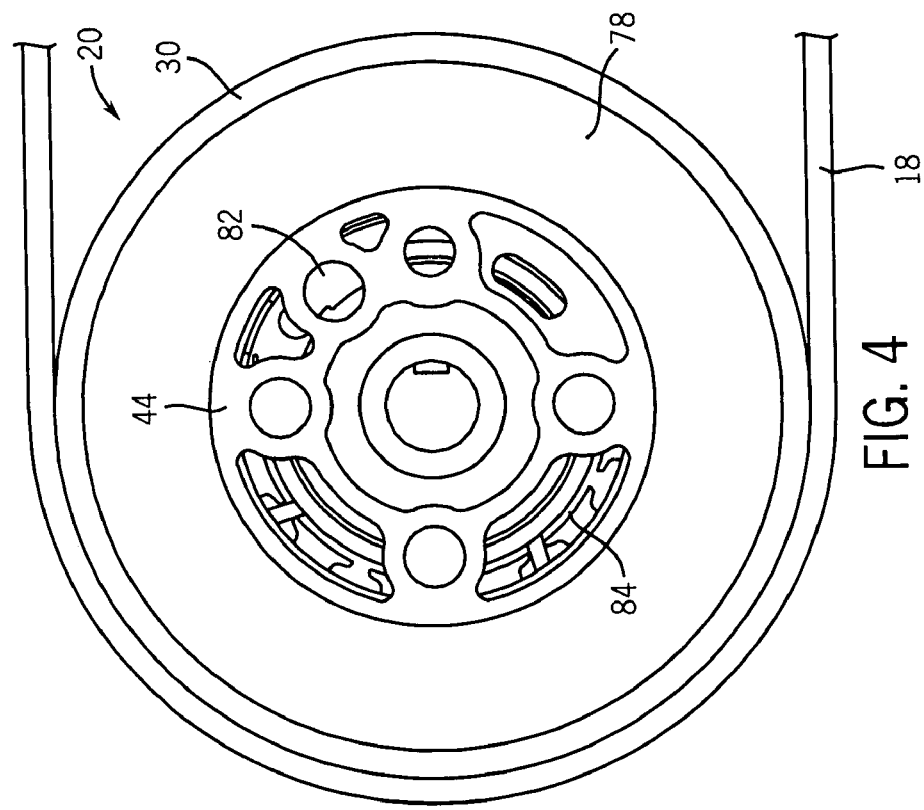
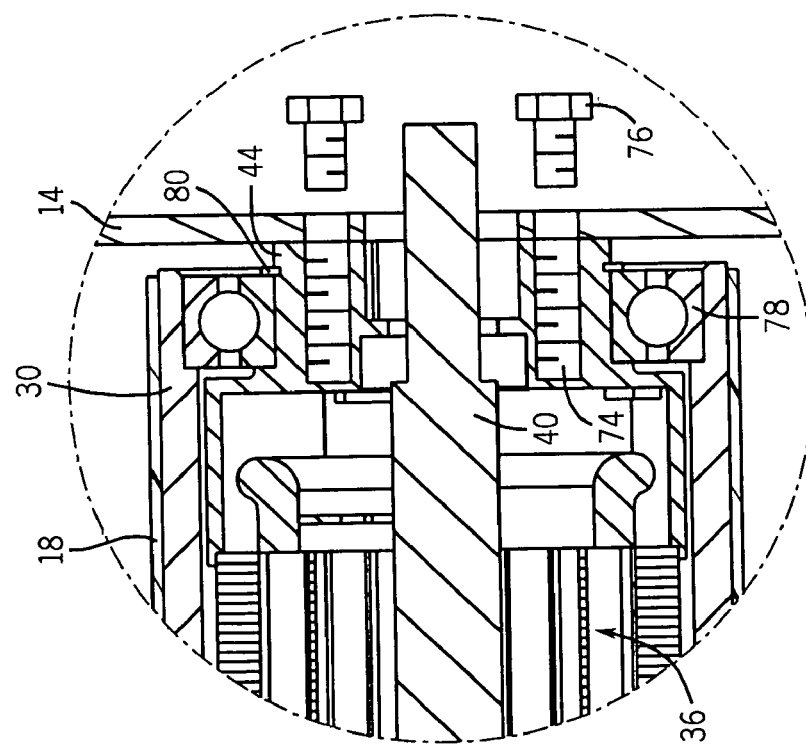

MOTORIZED PULLEY

BACKGROUND

The present invention relates generally to rotating devices and, more particularly, to motorized pulleys.

In many industrial settings, conveyor systems are employed to transport items from one location to another. By way of example, conveyor systems can be relatively large systems, such as those found in airport baggage areas, to relatively small systems, such as those found in commercial retail centers. In any event, traditional conveyor systems generally include a pulley that rotates with respect to a frame and that drives a belt surrounding the pulley. Indeed, traditional conveyor systems generally include a motor that drives a gear reducer, which, in turn, drives one or more pulleys that, in turn, drives movement of the belt coupled to the pulleys.

To conserve space, many conveyor systems include one or more pulleys that carry a motor and a gear reducer within the interior of the pulley. Such pulleys are often referred to as motorized pulleys. Traditionally, motorized pulleys include an internally disposed motor and an internally disposed network of gears and bearings that harness the torque of the motor to rotate the external surface of the pulley.

During operation, however, the internally located motor and gear assembly generate heat, which can negatively impact the performance and reliability of the motorized pulley. Moreover, generated heat can increase the surface temperature of the pulley, thereby increasing the likelihood of damage to the belt and decreasing the life expectancy of the belt, for instance.

Unfortunately, traditional motorized pulleys isolate the motor and motor assembly from the external environment, thereby reducing the efficacy of cooling. For instance, traditional motorized pulleys generally do not provide a thermally conductive pathway for effective and controlled dissipation of heat generated during operation. Moreover, traditional motorized pulleys, because of this isolated nature of the motor, do not facilitate use of the torque generated by the motor.

Therefore, there is a need for methods and apparatus for improving motorized pulleys.

BRIEF DESCRIPTION

In accordance with one embodiment, the present technique provides an exemplary motorized pulley. The exemplary pulley includes a housing that has a hollow internal region and that is rotatably coupleable to a support structure. Within the internal region are disposed an electric motor and a gear assembly, which, in cooperation with a rotatable element coupled to the rotor of the motor, transmits torque from the electric motor to the housing, causing rotation of the housing in relation to the support structure. To dissipate heat generated during operation of the electric motor, for instance, the electric motor is thermally coupleable to the support structure.

In accordance with another embodiment, the present technique provides another exemplary motorized pulley. This exemplary pulley includes a housing and, also, includes an electric motor and gear assembly that are disposed in the housing. The electric motor further includes a rotatable element that is secured to the rotor and that extends beyond the housing. Accordingly, the rotatable element extends into the external environment surrounding the motorized pulley. Thus, rotation of the rotatable element may be harnessed to operate a machine element coupled thereto. For instance, the rotatable element may be coupled to a tachometer or may facilitate operation of a brake for the electric motor or a cooling fan, for instance.

In accordance with another embodiment, the present technique provides an exemplary method for manufacture of a motorized pulley. The exemplary method includes that act of disposing a gear assembly and an electric motor within the hollow interior portion of the housing. The electric motor is disposed in the housing such that a fastener receiving portion of the end cap of the electric motor at least partially defines an external surface of the motorized pulley. Advantageously, these fastener receiving surfaces facilitate thermal coupling of the electric motor to a support structure, to dissipate heat generated during operation, for instance.

DRAWINGS

These and other features, aspects, and advantages of the present invention will become better understood when the following detailed description is read with reference to the accompanying drawings in which like characters represent like parts throughout the drawings, wherein:

FIG. 3 is a diagrammatic and detail view of the exemplary motorized pulley and conveyor system of FIG. 2 within arc 3-3;

FIG. 4 is a diagrammatic and end view of a motorized pulley and conveyor system, in accordance with an exemplary embodiment of the present technique.

DETAILED DESCRIPTION

As a preliminary matter, the definition of the term "or" for the purpose of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A", by itself "B" by itself and any combination thereof, such as "AB" and/or "BA."

The present technique is generally directed to motorized pulleys and conveyor systems. These pulleys and conveyor systems are used in many applications, and embodiments of these items and systems are discussed further below. However, it is worth noting that the following discussion relates to exemplary embodiments of the present technique, and the appended claims should not be viewed as being limited to the embodiments presented in the following discussion.

Figure 1:
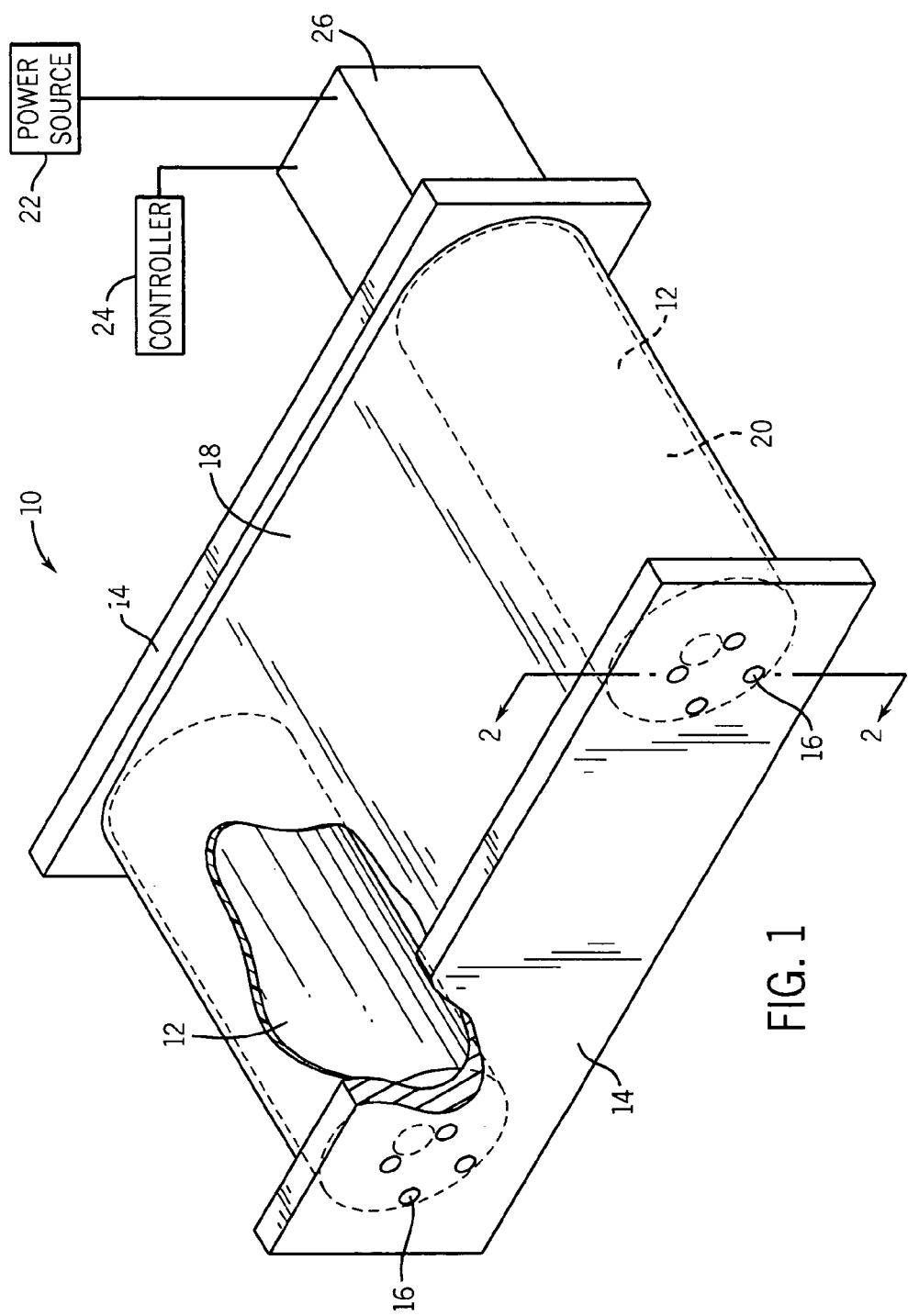
FIG. 1 is a diagrammatic and perspective view of a conveyor-belt system that includes a motorized pulley, in accordance with an exemplary embodiment of the present technique.

Turing to the figures and referring first to FIG. 1, an exemplary conveyor system 10 is illustrated. The exemplary system 10 includes a pair of drums or pulleys 12 that are rotatably coupled to support structures, such as the frames 14. As illustrated, the pulleys present a cylindrical shape;

however, any number of shapes and constructions are envisaged. The frame 14, as discussed further below, may present any number of constructions, and, in the present embodiment, has a metallic construction to facilitate thermal conductivity and dissipation of heat to the surrounding environment. To couple the frame 14 to the pulleys, a series of frame apertures 16 are provided. These apertures 16 are provided for the insertion of a fastener, for example, therethrough, to secure the frame 14 and pulleys 12 with respect to one another. The frame 14 acts as a torque arm against which the torque of the motor and gear assembly act to cause rotation of the pulley. (See FIG. 2.) The exemplary conveyor system 10 also includes a belt 18 that is disposed over the pulleys 12 and that travels in response to rotation of the pulleys 12.

To effectuate movement of the belt 18, the exemplary system 10 includes a motorized pulley 20, as discussed in detail further below. In summary, the motorized pulley 20 has an electric motor (see FIG. 2) that causes the motorized pulley 20 to rotate with respect to the fame 14. The exemplary motorized pulley 20, specifically the electric motor within the motorized pulley 20, receives operating from a power source 22. By way of example, the power source 22 may be a local power source, such as a battery, or may be an external or grid power source. Moreover, the power source 22 may provide any number of types and levels of voltage, such as alternating current (ac) or direct current (dc) power, or pulse width modulated (PWM) power from a PWM power source, for example. To manage operations of the motorized pulley 20, the system 10 also includes a controller 24, such as a processor, an inverter, a dc drive or programmable logic controller (PLC) device or any combination thereof. The electrical connections between the controller 24, the power source 22 and the motorized pulley 20 are housed in a protective box 26 that extends from and is coupled to the frame 14. It is worth nothing that in the presently described conveyor system 10 only a two-pulley system is shown; however, conveyor systems with any number of pulleys are envisaged. Moreover, it is worth nothing that conveyor systems including any number of motorized pulleys in conjunction with any number of dummy (i.e., non-motorized) pulleys 28 are also envisaged.

Figure 2:
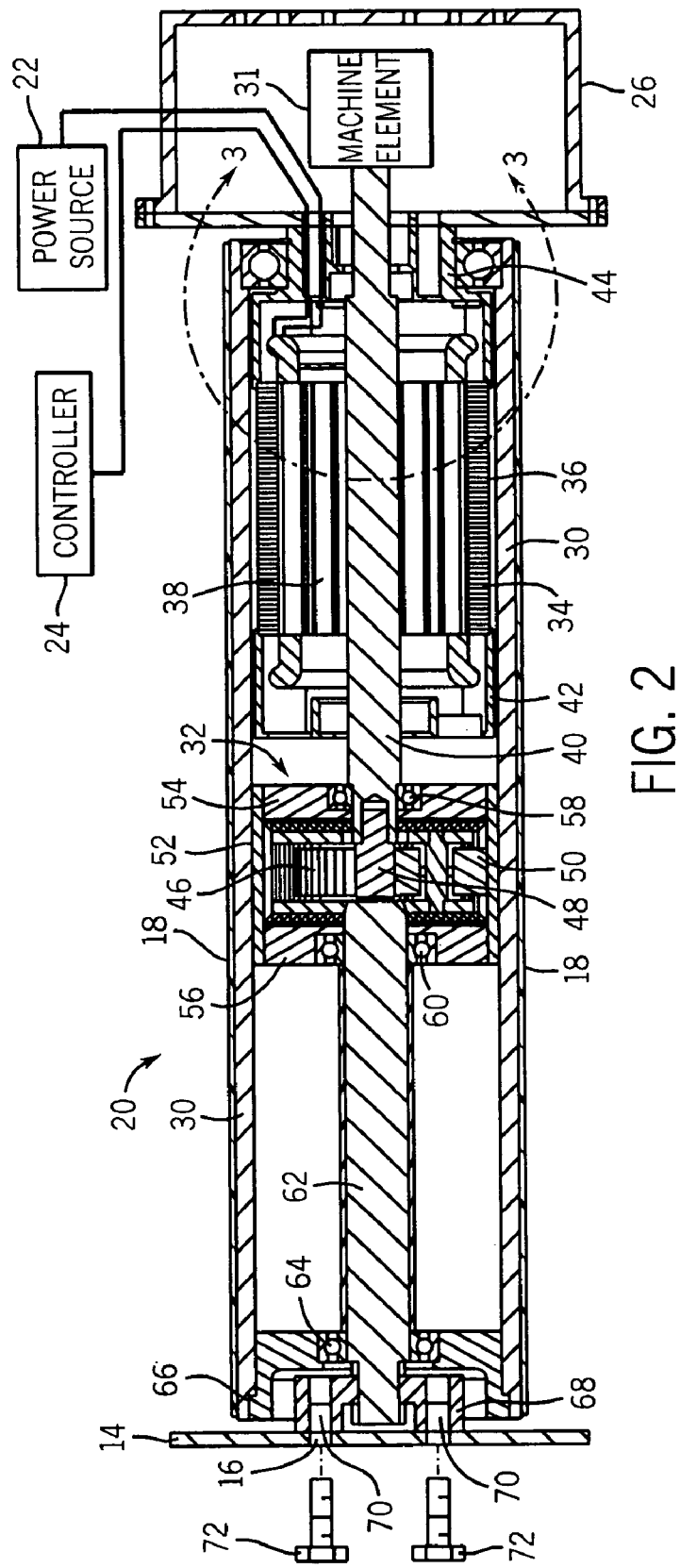
FIG. 2 is a diagrammatic and cross-sectional view of the motorized pulley and conveyor system of FIG. 1 along line 2-2.

FIG. 2 illustrates a cross-sectional view of the motorized pulley 20 along line 2-2 of FIG. 1. As illustrated, the belt 18 rides closely against the outer housing or rim 30 of the motorized pulley 20, and the rim 30 at least partially defines an external surface of the motorized pulley 20. And the frictional relationship between the rim 30 and the belt 18 causes the belt 18 to move in response to rotation of the motorized pulley 20. Additionally, the rim 30 defines a hollow internal volume 32 inside of which various components are located.

For example, the exemplary motorized pulley 20 includes an electric motor 34 disposed within this hollow region 32. The motor 34 can be of any of a number of types of suitable motors. For example, the exemplary motor 34 may comprises a direct current (dc) motor, a brushless dc motor, an alternating current (ac) motor, a squirrel cage motor, to name but a few types and constructions of motors. In the exemplary embodiment, the motor 34 includes a stator 36 that surrounds a rotor 38 extending therethrough. As will be appreciated by those of ordinary skill in the art, providing electrical current to the motor 34 establishes an electromagnetic relationship between the stator 36 and the rotor 38, and this relationship causes the rotor 38 to rotate. To harness this rotation, the exemplary motor 34 includes a rotatable element or rotor shaft 40 that is secured to the rotor 38 and that extends through both ends of the motor 34.

Additionally, this exemplary rotor shaft 40 extends beyond the perimeter of the rim 30 and, as such, facilitates the operation of a machine element 31 located externally with respect to the motorized pulley 20. For example, the rotation of the rotor shaft 40 may be harnessed to operate a measuring device, such as a tachometer or an encoder, for instance. As another example, the machine element 41 may comprise a brake that acts to mechanically reduce the speed of the rotor shaft 40 and, in turn, the rotor 38. As illustrated, placing the machine element 31 within the protective box 26 provides for a compact and manageable arrangement.

In the exemplary motor 34, both ends of the motor core (i.e., the stator 36 and the rotor 38) carry an end cap. Specifically, the exemplary motor 34 includes an inboard-side end cap 42 and an outboard side end cap 44. The end caps 42, 44 each carries a bearing assembly (e.g., roller bearings; not shown) that supports the rotor shaft 40 and, in turn, the rotor 38 within the motor 34. To facilitate cooling of the exemplary motor 34, the outboard-side end cap 44 at least partially defines an external surface of the motorized pulley 20 and, moreover, acts as a thermal conduit for transferring heat from the motor 34 to the frame 14, as discussed further below. Additionally, as also discussed further below, the outboard-side end cap 44 includes features that facilitate mounting of the motorized pulley 20 to the frame 14 and also includes features that facilitate the entry of cables to access the electric motor.

On the inboard side of the motor 34, the rotor shaft 40 is coupled to a gear assembly 46. The gear assembly 46, through a network of gears, transfers torque from the rotor shaft 40 to the rim 30 and, in turn, effectuates rotation of the rim 30 with respect to the frame 14. Advantageously, the gear assembly 46 acts as a speed reducer that translates the higher rotation rate of the rotor shaft 40 into a lower rotation rate for the rim 30. In the exemplary embodiment, the gear assembly 46 is a planetary gear system that includes a sun gear 48, planet gears 50 and a ring gear 52. Specifically, the sun gear 48 is coupled to the shaft 40 and rotates in conjunction with the shaft 40. The planet gears 50, however, surround the sun gear 48 and have a gear-ratio with respect to the sun gear such that they rotate at a slower rotational rate than the sun gear 48. The planet gears 50 are, in turn, coupled rotationally to and surrounded by the ring gear 52, which presents a gear ratio with respect to the planetary gears 50 such that the ring gear 52 rotates at a slower rotational rate than the planet gears 50. Because the ring gear 52 is secured to the rim 30, the rotational rate of the ring gear 52 dictates the rotational rate rim 30 and the motorized pulley 20.

The gear assembly 46 also includes a motor-side gear plate 54 and a non-motor-side gear plate 56. The gear plates 54, 56 rotate with the ring gear 52 and each includes a bearing assembly (e.g., roller bearings) that facilitates rotation of the motorized pulley 20. Specifically, the motor-side gear plate 54 includes a bearing assembly 58 that supports the rotor shaft 40 and, in turn, the motor 34. The inner race of the bearing assembly 58 is secured to the rotor shaft 40 and the outer race is secured to the motor-side gear plate 54. Additionally, the non-motor-side gear plate 56 carries a bearing assembly 60. The inner race of the bearing assembly 60 is secured to support shaft 62, which is a non-rotating shaft, and the outer race is secured to non-motor-side gear plate 56.

The support shaft 62 is supported by bearing assembly 64. Specifically, the inner race of bearing assembly 64 is secured to the support shaft 62 and the outer race is secured to end plate 66. The end plate 66 is secured to the rim 30 and rotates with the rim 30. Moreover, the end plate 66 at least partially defines an external surface of the motorized pulley 20. The support shaft 62 is surrounded by and secured to a mounting sleeve 68, which includes channels 70 that are configured to receive fasteners, such as bolts 72. (It is worth recalling that the exemplary support shaft 62 is a non-rotating element and it is worth noting that the mounting sleeve 68 does not rotate either.) Thus, the mounting sleeve 68 facilitates mounting of the motorized pulley 20 to the frame 14.

Turning to FIG. 3, this figure illustrates the mounting structures on the opposite end of the motorized pulley 20. As discussed above, the outboard-side end cap 44 includes at least one fastener receiving section 74 that at least partially defines an external surface of the motorized pulley 28 and that is configured to receive a fastener 76. Thus, the outboard-side end cap 44 facilitates mounting of the motorized pulley 20 to the frame 14. Because the outboard-side end cap 44 is mounted to the frame 14, the outboard-side end cap 44 does not rotate with the rim 30. To support the rim 30, the exemplary pulley 20 includes a bearing assembly 78. The inner race of the bearing assembly 78 is secured to the outboard-side end cap 44 and the outer race is secured to the rim 30. Advantageously, a retaining ring 80 that is secured to the outboard-side end cap 44 blocks unwanted lateral movement of the bearing assembly 78.

In the exemplary motorized pulley 20, the outward positioning of the motor 34 as well as the extension of the outboard-side end cap 44 afford cooling advantages to the pulley. For example, the outboard-side end cap provides a thermal pathway for heat generated during operation of the electric motor 34 to travel to the external environment and, for instance, into the frame 14. For example, the outboard-side end cap 44 thermally couples the electric motor 34 to the frame 14, which can act as a heat-sink for the electric motor 34. Advantageously, the contact between the outboard-side end cap 44 and the frame 14 provides a robust thermal interface for the two structures. Moreover, the exposed surfaces of the end cap 44, which at least partially define an external surface for the motorized pulley 20, also facilitate the transfer and dissipation of heat from the motor 34 to the environment.

Turning to FIG. 4, this figure illustrates a side view of an outboard-side end cap 44 and an exemplary pulley 20. It is worth noting that the present illustration is diagrammatical, and certain features are not shown for the ease of explanation. As illustrated, the outboard-side end cap 44 is exposed to the environment and, as such, at least partially defines an external surface of the motorized pulley 20. Advantageously, this outward construction facilitates access to the motor through the outboard-side end cap 44. For example, the exemplary end cap 44 includes an electrical access aperture 82 through which electrical contacts feed into the internal region of the motorized pulley 20. For instance, the power source 22 and controller 24 may provide leads that extend through the access aperture 82 to reach the electrical motor 34. Indeed, the stationary nature of the end cap 44 with respect to the frame 14 facilitates this insertion. Additionally, the exemplary end cap 44 includes cooling apertures 84 through which cooling airflow for the motor 34 passes.

Figure 5:
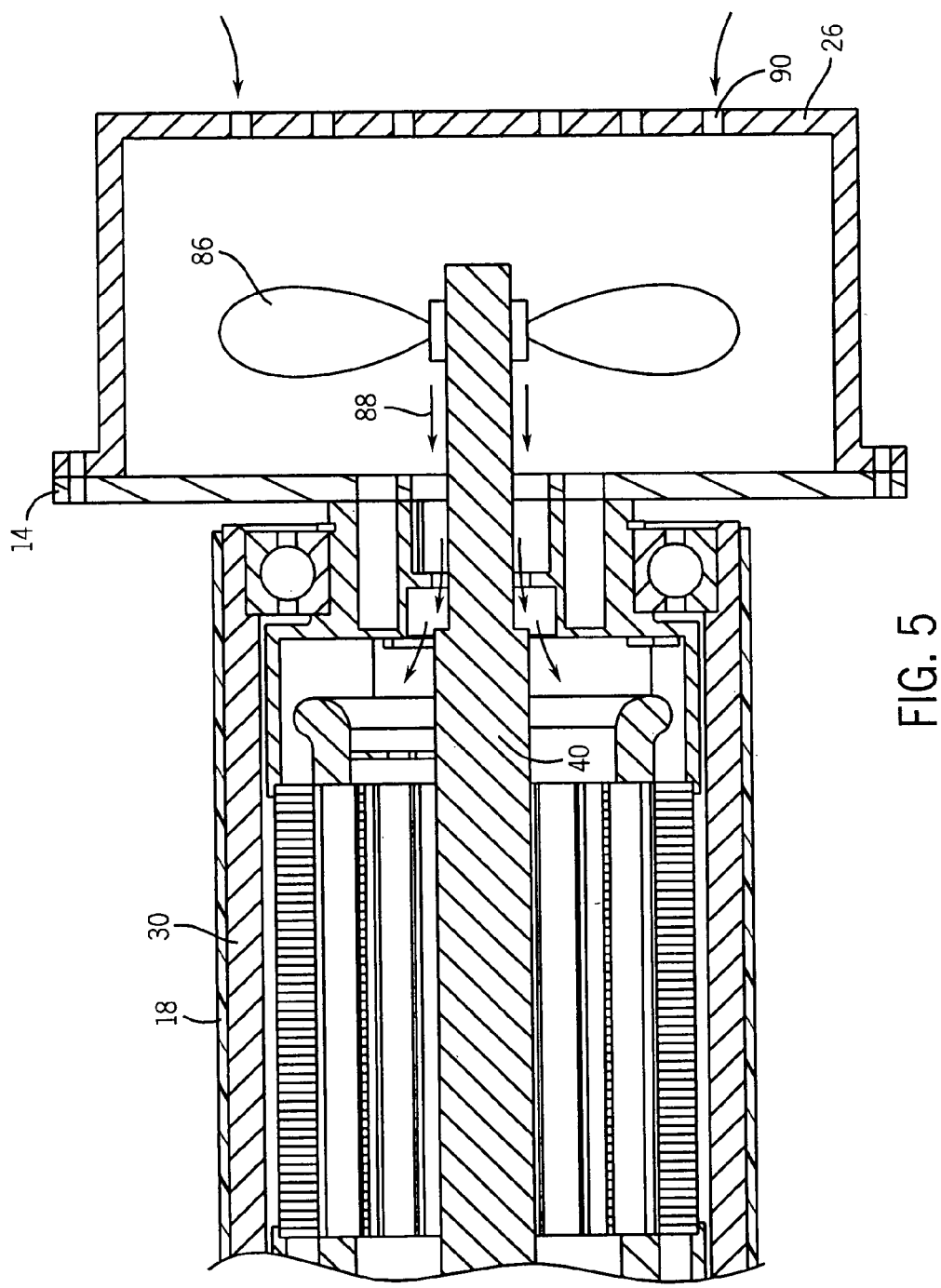
FIG. 5 is a diagrammatic and cross-sectional view of a motorized pulley and conveyor system having an airflow generating device, in accordance with an exemplary embodiment of the present technique.

Turning to FIG. 5, this figure illustrates an additional and exemplary embodiment of a motorized pulley 20. In this embodiment, the shaft 40 is coupled to a fan blade assembly 86. During operation, the fan blade assembly 86 rotates in conjunction with the rotor shaft 40, thereby generating cooling airflow 88 for the motor 34. A separate cooling fan can be used if desired. Specifically, the exemplary fan blade assembly 86 draws in air from the environment and directs its toward the motor 34 through cooling apertures 84 in the outboard-side end cap 44, for instance. (See FIG. 4.) To protect the fan blade assembly 86 from the environment, and to protect the environment from the fan blade assembly 86, it is disposed within the protective box 26. Advantageously, the protective box 26 includes vents 90 through which air from the environment may be drawn into the motor 34.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motorized pulley, comprising:
   a housing having a hollow internal region and being rotatably coupleable to a support structure, wherein the housing at least partially defines an external surface of the motorized pulley;
   an electric motor disposed in the hollow internal region comprising:
      a motor core having a rotor; and
      an end cap secured to an end of the motor core, the end cap having a bearing assembly allowing relative rotation between the end cap and the housing, the end cap being adapted to be secured to the support structure and being formed of a thermally conductive material to allow heat generated in the motor core to be transferred to the support structure, the end cap at least partially defining an external surface of the motorized pulley; and
      a rotatable element coupled to the rotor, the rotatable element extending through a center hole in the end cap past an outer surface of the end cap; and
   a gear assembly disposed in the hollow interior region and configured to transmit torque from the rotatable element to the housing to cause rotation of the housing with respect to the support structure; and
   a fan mounted on the rotatable element external to the hollow interior region; the fan forcing cooling air through the support structure adjacent the end cap into the hollow interior region to cool the motor core and the end cap during operation of the electric motor.

2. The motorized pulley as recited in claim 1, wherein the gear assembly comprises a planetary gear system.

3. The motorized pulley as recited in claim 1, wherein the gear assembly comprises an offset parallel gear reducer.

4. The motorized pulley as recited in claim 1, wherein the electric motor comprises a direct current (dc) motor.

5. The motorized pulley as recited in claim 1, wherein the end cap has a fastener receiving section that at least partially defines the external surface of the motorized pulley, the fastener receiving section facilitates securing the housing to the support structure.

6. The motorized pulley as recited in claim 1, wherein the end cap includes an aperture for receive an electrical conductor therethrough.

7. The motorized pulley as recited in claim 1, wherein the electric motor is configured to receive power from a pulse width modulated (PWM) device.

8. A motorized pulley system, comprising:
   a support structure;
   a first pulley rotatably coupled to the support structure;
   a second pulley rotatably coupled to the support structure, the second pulley element comprising:

a housing having a hollow internal region, wherein the housing at least partially defines an external surface of the motorized pulley;

an electric motor disposed in the hollow internal region and comprising:

a motor core having a rotor;

an end cap secured to an end of the motor core, the end cap having a bearing assembly allowing relative rotation between the end cap and the housing, the end cap being adapted to be secured to the support structure and being formed of a thermally conductive material to allow heat generated in the motor core to be transferred to the support structure, the end cap at least partially defines an external surface of the motorized pulley; and a rotatable element coupled to the rotor, the rotatable element extending through a center hole of the end cap past an outer surface of the end cap;

a gear assembly disposed in the hollow interior region and configured to transmit torque from the rotatable element to the housing to cause rotation of the housing with respect to the support structure; and a fan mounted on the rotatable element external to the hollow interior region; the fan forcing cooling air through the support structure adjacent the end cap into the hollow interior region to cool the motor core and the end cap during operation of the electric motor; and a belt disposed about the first and second pulleys;

a machine element configured to receive operating torque from the rotatable element, wherein the machine element is disposed outside the housing of the motorized pulley.

9. The motorized pulley system as recited in claim 8, comprising at least one fastener extending at least partially through the end cap and the support structure.

10. The motorized pulley system as recited in claim 8, wherein the end cap contacts the support structure.

11. The motorized pulley system as recited in claim 8, comprising a power source coupled to the electric motor.

12. The motorized pulley system as recited in claim 11, wherein the power source comprises a pulse width modulated (PWM) power source.

* * * * *